United States Patent Office 2,987,406
Patented June 6, 1961

2,987,406
HIGH DENSITY FLY ASH FRACTION
Leonard John Minnick, Cheltenham, Pa., assignor to G. & W. H. Corson, Incorporated, Plymouth Meeting, Pa., a corporation of Delaware
No Drawing. Filed Mar. 27, 1958, Ser. No. 724,247
10 Claims. (Cl. 106—97)

This invention relates to a novel dense, iron-rich particulate product. The product is particularly suited for use as a construction material in combination with lime-containing materials, such as lime itself or Portland cement, in providing cementitious mixtures of improved physical and chemical properties which are especially useful in pressure grouting operations and in the formation of dense concrete structures.

With the development of atomic energy as a source of industrial power there has arisen a need for dense structures to house atomic reactors, which dense structures perform the function of absorbing harmful radiation. It has been suggested to form such dense structures of concrete, employing a material of high specific gravity which is relatively plentiful and inexpensive, such as metallic iron or iron ore, to increase density. Alkaline earths in cement, however, react with iron to form substances, such as calcium ferrite, which are not cementitious, resulting in a structure which is not structurally sound. Also, the reaction between iron and the alkali of cement produces similar reaction products which adversely affect structural soundness.

The principal object of the present invention is to provide a novel dense, finely-divided, iron-rich material possessing novel chemical and physical properties.

Another primary object of this invention is to provide a novel and inexpensive material particularly suitable in providing cementitious mixtures, such as concrete, of improved physical and chemical properties.

Another object of this invention is the provision of a material for use in providing a dense cementitious mixture of high strength especially useful in cementing deep oil wells, in preparing anti-buoyancy concrete coatings and structures and in the formation of massive concrete structures.

A further object of the invention is the provision of an inexpensive material which when employed in the preparation of hydraulic cementitious mixtures decreases setting time and reduces the quantity of water required to provide a cementitious mixture of a desired consistency.

Still another object of this invention is to provide a construction material for employment in providing a concrete of high density and great structural strength particularly suitable for use in forming massive, dense, radiation shields for atomic reactors.

A further object of the invention is the provision of a building material which exhibits high pozzolanic action when employed in compositions containing lime and/or Portland cement.

Yet another object of this invention is the provision of a novel and inexpensive construction material from fly ash, which material is particularly useful in providing neat cements, grouts, mortars, concrete and structural building units of improved chemical and physical properties.

A still further object is the provision of novel concrete mixtures of high chemical resistivity, high density, and greater strength.

These and other objects of this invention will become apparent from a consideration of this specification and claims.

According to this invention there is provided a construction material possessing high reactivity with lime and with Portland cement consisting essentially of discrete, substantially sphere-like particles having a particle size less than about 100 mesh and consisting essentially of a silica-alumina glass envelope and matrix said matrix having dispersed therein crystallites of a ferromagnetic spinel, said particles containing between about 70 and about 95% of iron, expressed at $Fe_2O_3$, present as a constituent of said glass matrix and said ferromagentic spinel crystallites, between about 3 and about 12% of silica and between about 1 and about 6% of alumina, said particles having specific gravity of from about 3.8 to about 4.8.

It has been found that by reason of the unique group of physical and chemical properties of the material of this invention it is particularly suitable for use in combination with lime-containing materials such as lime itself, Portland cement and other mixtures containing lime, and as such provides cementitious mixtures with a number of extremely desirable properties. Because of the extremely high iron content of the present product, it is surprising that it does not result in non-cementitious reaction products with alkali and alkaline earths. This is due at least in part to the outer envelope or layer of silica-alumina glass which acts as a barrier between the normally reactive iron within the particle and other materials, such as alkali and alkaline earths, which are mixed with the particles. For the sake of convenience, reference generally will be made herein to the use of the novel material of this invention as an admixture; however, it may be mixed with cement, lime or lime-containing mixtures, in any suitable manner, as for example during grinding of the cement, in which case it is generally referred to as an addition.

The novel product of this invention consists essentially of extremely small, discrete, sphere-like particles, i.e. the particles are tiny globular bodies. The sphere-like particles may all be of substantially the same size, but preferably the mixture of particles presents a size gradient, i.e. the product may comprise particles varying in size, with various proportions of particles classified according to a particular size classification. All of the sphere-like particles should have a particle size below about 100 mesh, and preferably, a major portion, for example 70% or more, of the particles in the mixture have a particle size below about 200 mesh.

It has been found that when the material of this invention is employed as an admixture in cement mixtures, such as concrete, there is a substantial reduction in water requirement, i.e. in the quantity of mixing water, in obtaining a particular consistency or workability. Further, it appears that the sphere-like particles may improve the grading of the cement fraction of cement mixtures.

The reduction in water requirement afforded by this novel material is, of course, extremely advantageous. The strength of a cement mixture varies as the ratio of cement to voids (free water) of the mixture, as the mixture sets. Since less water is necessary to obtain a desired consistency of a cement mixture containing the material of this invention, a cement mixture of any suitable consistency will have greater strength than a mixture provided with a similar consistency by use of a larger quantity of water due to the greater free water content of the latter. One advantage of employing cement mixtures containing the material of this invention in oil well cementing operations, therefore, is that a pumpable consistency may be obtained with substantially reduced amounts of water, resulting in a cement casing or the like of considerably greater strength and substantially reduced premeability. Similarly, in the formation of massive concrete structures, increased structural soundness may be obtained by reason of this reduction in water requirement.

Another advantageous property of the material of this invention is the extreme fineness of the particles. Thus, although the particles may vary in size, because of their fineness, variations in size of the particles and/or size gradient, do not affect water requirement to any substantial degree. Workability, a property of freshly mixed mortar, concrete, or the like, is subject to continual inspection and checking throughout the mixing and placing operation, but strength, a property of hardened concrete, cannot be measured until it is too late for alteration by any means short of difficult, costly replacement. Strength can be predicted from factors known in advance and that are subject to checking and regulation as placement proceeds. Thus, because the product described herein is substantially uniform as regards water requirement in providing a specified consistency, strength of a hardened concrete containing the building material can readily be predicted, other factors affecting strength, of course, being controlled to the requisite degree.

The sphere-like particles of the present material comprise a silica-alumina glass envelope and matrix the matrix having dispersed therein a high proportion of extremely small crystallites of ferromagnetic spinel. In other words, the particles are substantially spherical bodies made up of a complex heterogeneous structure comprising an outer protective layer of the stated silica-alumina glass and a core in which are included the stated ferromagnetic spinel crystallites dispersed in a silica-alumina glassy phase rendered opaque due to the formation of the crystallite therein. The glass phase may also comprise small amounts of dissolved iron and alkali and alkaline earth metals, such as sodium, potassium, magnesium, and the like. Embedded in the glass matrix core are substantially crystalline particles of a ferromagnetic spinel, of the general formula $MO \cdot Fe_2O_3$, in which M is a divalent metal such as ferrous iron, magnesium, manganous manganese, zinc, and combinations thereof, and the like. X-ray studies show that the bulk of the ferromagnetic spinel is in the form of magnetite, $Fe_3O_4$.

Each particle will generally comprise from about 70% to about 95% of iron, expressed as $Fe_2O_3$, which iron will be present as a constituent of the glass matrix and in the form of a ferromagnetic spinel. Each particle will also contain between about 3 and about 12%, by weight of silica, preferably between about 5 and about 10% of silica; and between about 1 and about 6% of alumina.

Because of the relatively high iron content of the particles and their fine particle size, the material of the invention has a relatively high specific gravity on the order of about 3.8 to 4.8, varying with iron content of the particles. If the average iron content of the mixture of particles is on the order of about 95%, expressed as $Fe_2O_3$, and 70% or more of the particles have a particle size of less than about 200 mesh, the mixture will have a specific gravity of about 4.8. On the other hand, if the iron content is about 78%, the specific gravity will be somewhat lower or on the order of about 4.0. The product also possesses a high heat conductivity and a high specific heat.

The internal structure of the particle is such that when subjected to a magnetic field the particle behaves as a magnetic dipole.

The high specific gravity and high specific heat of the material are extremely advantageous properties in the formation of certain types of cement or concrete structures. For example, in cementing deep oil wells it is desirable to have a dense concrete to provide greater weight in counteracting high well pressures. Also, when used in forming massive concrete structures as radiation shields for atomic reactors, the high specific gravity material provides the concrete with the required high density. As stated above, considerable heat is liberated during the process of setting and hardening of a cement mixture. Because of the high specific heat of the particles, temperature rise in the cement mixture due to the heat liberated by the hydration and crystallization reactions taking place may be significantly decreased. In oil well cementing operations this is particularly advantageous, for the rate of set may thereby be considerably retarded. Since in masive concrete structures, the heat liberated can raise the temperature to such values that, on cooling, thermal contraction would produce damage, the particles of high specific heat control to a substantial degree undesirable temperature rise during setting of the cement mixture. Moreover, since the present product is highly pozzolanic, some of the cement, which accounts for the generation of heat, may be replaced by lime thereby reducing the heat generated.

As is well known, pozzolanic materials are generally finely divided siliceous and aluminous substances which are not cementitious themselves, but combine with alkali (including alkaline earths) and water to form stable compounds of cementitious value. The building material of this invention is surprisingly highly pozzolanic in spite of the extremely high iron content and low silica and alumina contents, forming strong cementitious materials with alkali, such as calcium hydroxide in cement. As stated previously, the sphere-like particles have dispersed therein a ferromagnetic spinel. It is common knowledge that alkali reacts preferentially with iron in certain forms, e.g., magnetite and other ferromagnetic spinels to form compounds which are not cementitious. However, the sphere-like particles of the present invention readily react with alkali to form cementitious products in spite of the very low silica and alumina contents and high iron content. This is due to the fact that on the particles there is an outer layer which is predominately the stated glassy phase which acts as a protective film preventing contact with the iron in the core.

Moreover, when the present product is prepared in a dry way in accordance with a preferred method of preparation and the material is not subjected to water which would leach away soluble materials, the particles have a surface film or coating comprising a water soluble salt, which film selectively promotes reaction between the silica-alumina glass envelope and alkali and helps to inhibit akali reaction with the ferromagnetic spinel. It is also believed that this film combines with any ferromagnetic spinel which may be adjacent to the surface of the sphere-like particles to form compounds which do not react with iron, and also etches the silica-alumina glass envelope to promote reaction between it and alkali. Any dissolved iron, even in substantial amounts, forming a part of the glass envelope apparently does not react with alkali to form non-cementitious compounds. Thus, the sphere-like particles of the material of this invention act as a true pozzolan with little or no formation of calcium ferrite or other non-cementitious compounds taking place.

This chemical property of the sphere-like particles is extremely advantageous for several reasons. Since there is little or no reaction between iron in the particles and the alkali of cement, there is no deleterious effect on structural soundness. Further, the materials formed by reaction of alkali with the glass envelope of the particles are cementitious in nature and, therefore, enhance the physical properties of the product.

As is well known, a substantial quantity of free calcium hydroxide is produced in Portland cement concrete during setting and hardening. By the incorporation of the present product in cement mixtures the free calcium hydroxide present in the cement mixture reacts with the sphere-like particles because of their pozzolanic properties forming stable, cementitious compounds with the free lime. In this way cement mixtures are provided with markedly improved resistance to attack by chemicals such as sulfuric acid, hydrogen sulfide gas and the like. Also, water tightness, i.e., the resistance of cement mixtures to the passage of water, is markedly improved with the use of the building material of this invention. Due to the greater water tightness and improved chemical resistivity of cement mixtures containing this novel building material, the use thereof in pressure grouting is immediately apparent for permeability and chemical resistance are extremely important factors in such cementing operations.

The salt film on the surface of the sphere-like particles of one embodiment of the invention may comprise any water soluble salt or mixture of water soluble salts which enhances the pozzolanic properties of the particles by selectively inhibiting reaction between alkali and the ferromagnetic spinel but does not interfere with, and preferably promotes, the reaction of the alumina-silica glass envelope with alkali. Water soluble salts for this purpose include sulfates, including acid sulfates, and mixtures thereof, as for example alkali metal and alkaline earth metal sulfates and acid sulfates such as sodium, potassium and magnesium sulfates and acid sulfates. Also included in the film is sulfuric acid which adheres to the particles during their formation. The salt film is relatively thin as compared to the diameter of the spheres, and because of the small size of the spheres, it may be as thin as a molecular layer. Generally, the salt film does not make up more than about 2%, by weight, of the particle. The film of water soluble salt may be formed on the surface of the sphere-like particles either during or after formation of the particles. In the first case, as it will be more fully described hereinafter, alkali and alkaline earth metals and sulfur compounds, such as sulfur trioxide, sulfuric acid and the like, present during the formation of the sphere-like particles results in the formation of a film of a water-soluble salt or salts on the particles. However, if the particles are formed in the absence of such film forming materials or if the salt film initially formed has been removed, the film may be applied by applying to the sphere-like particles into a solution of a salt or mixture of salts and drying.

In concrete mixture the relative proportions of the present material to Portland cement may vary widely in order to obtain advantages through the inclusion of the present material. For ordinary concrete the present material may make up from about 10 to about 40%, by absolute volume, based on the absolute volume of the Portland cement plus the present material. For dense concretes, the present material will make up from about 40 to about 70% on the same basis. Aggregate is also normally employed and in an amount between about 3 and about 6 volumes of aggregate per volume of Portland cement plus present material.

A preferred method for manufacturing the building material of this invention employs fly ash as a source of raw material. The fine ash resulting from the combustion of pulverized coal and passing up the stack is commonly referred to as fly ash. Fly ash, as it comes from the collecting equipment, is a gray powdery substance of such fineness that 100% passes through a 16 mesh screen and in excess of 95% passes through a 100 mesh screen, and on the order of 75% or more passes through a 325 mesh sieve. The particles passing a 325 mesh sieve range downward in size to sub-micron, or less than 1/25,000 in.

Fly ash is a heterogeneous mixture of different substances of widely varying chemical and physical natures ranging from relatively large, irregular, black coke-like particles to almost transparent, sub-micron glassy beads.

Through chemical analysis of various fly ashes it has been determined that on a carbon-free basis, fly ash comprises from about 41–56% $SiO_2$, 20–34% $Al_2O_3$, 5–17% $Fe_2O_3$, 2–7% $CaO$, and from about 0–6%, alkaline sulfates including acid sulfates, such as alkali and alkaline earth metal sulfates and acid sulfates. The alkali metal and alkaline earth metal sulfates in fly ash are present as a film on the sphere-like particles, condensing on the particles as the particles leave the high temperature furnace region.

As will be evident from the data hereinafter set forth, fly ash as such does not possess the novel properties of the product of the present invention.

The material of this invention represents only about 10–15% of the raw fly ash from which it is obtained. After screening raw fly ash to remove particles having a particle size greater than about 100 mesh, the present product may be obtained by the method of copending application Serial No. 672,391, filed July 17, 1957, now abandoned. According to the method of this copending application fly ash, from which particles over 100 mesh have been removed, is introduced into a magnetic field which increases in mean field intensity with distance from a region of maximum field intensity. At substantially each point in at least a portion of the magnetic field, the field varies in direction with time, the variation in direction comprising a magnetic component rotating about each point. The rotating magnetic component spins magnetic particles in the fly ash with an angular velocity which, upon collision of such magnetic particles with each other with the other particles, imparts a translational velocity to the particles, establishing within the mass of particles an expanded state in which the distance between the particles is great as compared to the size of the particles and the particles are in turbulent motion. The linear velocity of the particles other than the stated magnetic particles carries them beyond and away from the expanded mass of the stated magnetic particles, which are retained in the magnetic field by the space change in flux density. Preferably the mean field intensity in the region of maximum field intensity is from about 40 to about 80% of the magnetic force necessary for magnetic saturation of the magnetic particles, and the decrease in mean intensity with distance from the region of maximum field intensity is from about 1 to about 5 inches per square meter per meter. Also a mean speed of rotation for the rotating magnetic components of the field of from about 300 to about 4000 radians per second is preferred.

This method of obtaining the material of this invention from the above-described residue of combustion of pulverized coal is extremely advantageous for a number of reasons, but particularly because the previously-mentioned salt film on the surface of the magnetic particles is not disturbed. Although a preferred method for obtaining the present product is that disclosed in the above-mentioned copending application, it is possible that other types of manufacturing methods may be employed with some success. For example, the particles of the present invention may also be obtained from fly ash by a wet magnetic separation procedure adapted to selectively separate particles having the described iron content from the remainder of the mass. In this case, however, care must be taken to avoid substantial removal of the glass envelope. Dispersing fly ash in water results in an acid medium due to the dissolution of the salt film, and adhering sulfuric acid and the resulting solution attacks the glassy envelope. Thus, when a wet magnetic separation method is employed the pH of the aqueous medium must be controlled and maintained on the alkaline side through the addition of a suitable base.

The use of raw fly ash as an admixture in Portland cement concrete has been suggested and fly ash has been so used in certain applications. Although raw fly ash provides concrete with certain desirable properties, the use thereof in certain building operations, as for example the cementing of oil wells and the formation of dense concrete radiation shields has a number of disadvantages. For example, the use of raw fly ash generally results in no change or no significant reduction in the water requirement for a given consistency and in fact water requirements of concrete containing fly ash have been found to be non-uniform and erratic. Also raw fly ash has a lower specific gravity than cement. Increased density is an essential property of a cement mixture for use in such application as oil well cementing and radiation shield construction, and reduction of water requirement, although desirable in all cementing operations, is particularly essential in the cementing of oil wells.

Since the pozzolanic action of the novel material is somewhat slower than cement hydration, the early strength of a concrete not containing the present material may sometimes be greater than for a concrete in which the present material has been substituted for a portion of the cement. However, due to the pozzolanic action of the present material, the later strength of the concrete containing it will be superior. This latter fact will become apparent from certain of the specific examples set forth herein.

The following specific examples are given for the purpose of illustration and are not intended to limit the scope of this invention:

EXAMPLE I

This example illustrates the advantageous properties of the product of the present invention in concrete with respect to reduced water requirements and increased strength. Three mixes are prepared with ingredients and proportions based on the following table. From each mix, three cylinders, 3¼" x 6½", are molded and after seven and twenty-eight days, respectively, the compressive strength is measured. The results are set forth in the following table:

Table I

|  | Mix | | |
| --- | --- | --- | --- |
|  | A | B | C |
| Portland cement (lbs.) | 470 | 400 | 400 |
| Fly ash (lbs.) | 0 | 160 | 0 |
| Product of present invention [1] (lbs.) | 0 | 0 | 280 |
| Sand (lbs.) | 1,400 | 1,370 | 1,370 |
| Stone (¾ inch) (lbs.) | 1,825 | 1,785 | 1,785 |
| Slump (inches) | 4 | 5 | 4 |
| Water (gal.) | 37 | 41.2 | 34.2 |
| Unit weight (lbs./cu. ft.) | 150 | 145 | 165 |
| Comp. strength: | | | |
| 7 days | 2,277 | 1,684 | 2,693 |
| 28 days | 3,450 | 3,260 | 3,860 |

[1] Prepared by the method of co-pending application Serial No. 672,391.

EXAMPLE II

In accordance with this example three mixes are prepared and tested in accordance with ASTM C311-54T as follows (all parts by weight): (D) 500 parts of Portland cement and 1375 parts of graded Ottawa sand; (E) 500 parts of Portland cement, 125 parts of fly ash and 1250 parts of graded Ottawa sand; and (F) 500 parts of Portland cement, 125 parts of the product of the present invention as in Example I and 1250 parts of graded Ottawa sand. With each mix is added sufficient water to produce a flow of 100–115%.

The results are as follows:

Table II

|  | Mix | | |
| --- | --- | --- | --- |
|  | D | E | F |
| Water requirement (ml.) | 250 | 260 | 230 |
| Percent Flow | 105 | 105 | 105 |
| Comp. Strength: | | | |
| 7 days | 3,253 | 3,939 | 4,736 |
| 28 days | 3,827 | 5,407 | 5,507 |

EXAMPLES III–IV

These examples illustrate the pozzolanic action of the material of the present invention with lime. Mixes are prepared based on the following formulae from which are pressed (under 2000 p.s.i.) discs one inch in diameter and ¼ inch thick.

| Example | Lime [1] (pts., by wt.) | Fly ash (pts., by wt.) | Present product (pts., by wt.) | Water, ml. |
| --- | --- | --- | --- | --- |
| III | 15 | 85 |  | 20 |
| IV | 15 |  | 85 | 9 |

[1] Pennsylvania dolomite, CaO hydrated but MgO not hydrated.

The discs are subjected to various curing conditions as set forth as follows:

| Series | Time | Temperature |
| --- | --- | --- |
| A | 30 days | 70° F.[1] |
| B | 7 days | 140° F.[1] |
| C | 16 hours | 210° F.[2] |
| D | 8 hours | autoclaved at 120 p.s.i.g. |

[1] Held in sealed container during curing.
[2] In steam bath.

All samples are then tested for hardness, cohesive strength and abrasive resistance. Individual ratings for the two sets of mixes in each series were given as follows: 0 for failed, 25 for poor, 50 for fair, 75 for good and 100 for excellent. Example III, series A, B, C, and D averaged 55 while each of series A, B, C and D of Example IV was rated 100.

Although the novel composition of this invention is particularly useful as an admixture in Portland cement concrete or with lime, it has a number of other valuable uses. For example, due to the high iron content of the sphere-like particles it is extremely valuable as a substitute for iron ore and as a parting agent in metal drawing operations. The novel composition may also be used as a core material in core tuners, such as those employed in television sets, and as a high density filler in other applications.

I claim:
1. A material consisting essentially of discrete, substantially sphere-like particles having a particle size less than about 100 mesh and consisting essentially of a silica-alumina glass envelope and matrix, said matrix having dispersed therein crystallites of a ferromagnetic spinel, said particles containing between about 70% and about 95% of iron, expressed as $Fe_2O_3$, present as a constituent of said glass matrix and of said ferromagnetic spinel crystallite, between about 3 and about 12% of silica and between about 1 and about 6% of alumina, and said particles having a specific gravity of from about 3.8 to about 4.8.

2. The product of claim 1 in which at least a major portion of said particles have a particle size below about 200 mesh.

3. The product of claim 1 wherein said particles contain between about 5 and about 10% of silica.

4. A material consisting essentially of discrete, substantially sphere-like particles having a particle size less than about 100 mesh and consisting essentially of a silica-alumina glass envelope and matrix, said matrix having dispersed therein crystallites of a ferromagnetic spinel, and on the surface of said particles a film comprising a water soluble salt selected from the group consisting of alkali and alkaline earth metal sulfates and acid sulfates, said particles containing between about 70 and about 95% of iron, expressed as $Fe_2O_3$, present as a constituent of said glass matrix and of said ferromagnetic spinel crystallites, between about 3 and about 12% of silica and between about 1 and 6% of alumina, and said particles having a specific gravity of from about 3.8 to 4.8.

5. The product of claim 4, in which at least a major portion of said particles have a particle size below about 200 mesh.

6. The product of claim 4 wherein said particles contain between about 5 and about 10% of silica.

7. A cement composition comprising Portland cement and a material consisting essentially of discrete, substantially sphere-like particles having a particle size less than about 100 mesh and consisting essentially of a silica-alumina glass envelope and matrix, said matrix having dispersed therein crystallites of a ferromagnetic spinel, said particles containing between about 70 and about 95% of iron, expressed as $Fe_2O_3$, present as a constituent of said glass matrix and of said ferromagnetic spinel crystallites, between about 3 and about 12% of silica and between about 1 and about 6% of alumina, and said particles having a specific gravity of from about 3.8 to about 4.8, said material comprising from about 10 to about 70%, by absolute volume, based on the absolute volume of Portland cement plus said material.

8. The cement composition of claim 7 in which at least a major portion of said particles have a particle size below about 200 mesh.

9. A cement composition comprising Portland cement and a material consisting essentially of discrete, substantially sphere-like particles having a particle size less than about 100 mesh and consisting essentially of a silica-alumina glass envelope and matrix, said matrix having dispersed therein crystallites of a ferromagnetic spinel, and on the surface of said particles a film comprising a water soluble salt selected from the group consisting of alkali and alkaline earth metal sulfates and acid sulfates, said particles containing between about 70 and about 95% of iron, expressed as $Fe_2O_3$, present as a constituent of said glass matrix and of said ferromagnetic spinel crystallites, between about 3 and about 12% of silica and between about 1 and about 6% of alumina, and said particles having a specific gravity of from about 3.8 to 4.8, said material comprising from about 10 to about 70%, by absolute volume, based on the absolute volume of Portland cement plus said material.

10. The cement composition of claim 9 in which at least a major portion of said particles have a particle size below about 200 mesh.

References Cited in the file of this patent

UNITED STATES PATENTS

| | | |
|---|---|---|
| 2,250,107 | Nelles | July 22, 1941 |
| 2,553,759 | Geiger | May 22, 1951 |
| 2,568,881 | Albers-Schoenberg | Sept. 25, 1951 |
| 2,766,211 | Miller | Oct. 9, 1956 |

OTHER REFERENCES

Chemical Engineering News, vol. 59, No. 12, December 1952, pp. 247–248.

S. Eketorp, Eng. & Min. J., vol. 152, No. 10, pp. 82, 83 and 118, October 1951.